United States Patent Office 2,748,178
Patented May 29, 1956

2,748,178

CONDENSATION OF AN AROMATIC COMPOUND WITH AN UNSATURATED ORGANIC COMPOUND IN THE PRESENCE OF AN ALKALI METAL AND A PEROXY COMPOUND

Herman Pines and Vladimir N. Ipatieff, Chicago, Ill., assignors to Universal Oil Products Company, Chicago, Ill., a corporation of Delaware No Drawing. Application April 4, 1951,
Serial No. 219,315

9 Claims. (Cl. 260—668)

This invention relates to the condensation of unsaturated organic compounds with aromatic compounds and to products formed thereby. This invention relates more particularly to the side chain alkylation with an olefin of an alkylaromatic hydrocarbon in which a carbon atom combined with the aromatic nucleus is also combined with at least one hydrogen atom. The process relates still more specifically to the side chain alkylation with ethylene of an alkylbenzene hydrocarbon having at least one hydrogen atom combined with a carbon atom in alpha position to the benzene ring.

The condensation of aromatic compounds with unsaturated organic compounds such as the alkylation of aromatic hydrocarbons with olefinic hydrocarbons, has been the subject of many investigations over a long period of time. Many different catalysts have been used including various mineral acids and acid-acting compounds but in all of these reactions, nuclear condensation has always been effected. Thus in the acid catalyzed alkylation of aromatic compounds having attached to a carbon atom of the ring a saturated carbon atom to which is attached at least one hydrogen atom, the entering alkyl group attaches to the aromatic nucleus. No direct catalytic method of introducing the alkyl group into the side chain has been known. Heretofore we accomplished side chain alkylation of toluene and related alkylaromatic compounds by non-catalyzed thermal means set forth in our copending application Serial Number 152,991 filed March 30, 1950, now abandoned, but this thermal alkylation process requires high temperatures and high pressures for its successful operation.

We have now found that side chain alkylation of toluene and other carbocyclic aromatic and heterocyclic aromatic ring compounds having a non-olefinic double bond such as pyridine, quinoline, pyrrols, etc. and having attached to a nuclear carbon atom a saturated carbon atom to which is attached at least one hydrogen atom may also be used as starting materials to effect side chain alkylation with an olefin at relatively lower temperatures and pressures in the presence of a catalyst comprising essentially an alkali metal and an organic peroxy compound. The carbon atom which is attached to the aromatic nucleus of said aromatic compounds is referred to as a "saturated" carbon atom because it is a part of a non-olefinic group such as an alkyl group, a cycloalkyl group, a cycloalkalkyl group or, an aralkyl group containing no ethylenic bonds or similar unsaturation.

An object of this invention is to react an unsaturated organic compound with an aromatic compound selected from the group consisting of carbocyclic and heterocyclic aromatic ring compounds having attached to a nuclear carbon atom a non-olefinic or saturated carbon atom to which is attached at least one hydrogen atom.

An additional object of this invention is to react a monoolefin with an alkylaromatic hydrocarbon to form an aromatic hydrocarbon with a longer alkyl group.

Another object of this invention is to condense ethylene with the side chain of an alkylaromatic hydrocarbon having attached to a nuclear carbon atom a carbon atom of said alkyl group to which is attached at least one hydrogen atom.

Still another object of this invention is to condense ethylene with the alkyl side chain of an alkylbenzene hydrocarbon, said side chain containing an alpha carbon atom to which is attached a replaceable hydrogen atom.

A further object of this invention is to condense ethylene with the cycloalkyl group of a cycloalkylbenzene hydrocarbon, said cycloalkyl group having a hydrogen atom combined with the carbon atom of the cycloalkyl group which is attached to the aromatic ring.

A still further object of this invention is to provide a process for the side chain alkylation of an alkylaromatic hydrocarbon.

A further object of this invention is to condense ethylene with a polycyclic hydrocarbon having at least one of the rings saturated and having at least one hydrogen atom combined with the carbon atom of the saturated ring which is attached to the aromatic ring.

An additional object of this invention is to provide a method for producing an aromatic compound containing a long hydrocarbon side chain, said compound being useful in the production of detergents, wetting agents and the like.

One embodiment of this invention relates to a process which comprises reacting an olefinic hydrocarbon and an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloalkalkyl group, and an aralkyl group and to which last named carbon atom is attached at least one hydrogen atom, the process being carried out at condensation conditions in the presence of an alkali metal and an organic peroxy compound, and recovering the resultant condensation product.

A second embodiment of this invention relates to a process which comprises reacting a non-conjugated olefinic hydrocarbon and an aromatic compound selected from the group consisting of carbocyclic aromatic and heterocyclic aromatic ring compounds having attached to a nuclear carbon atom a carbon atom of a saturated hydrocarbon group and to which last named carbon atom is attached at least one hydrogen atom at condensation conditions in the presence of an alkali metal and an organic peroxy compound, and recovering the resultant condensation product.

Another embodiment of this invention relates to a process which comprises reacting a monoolefin and an aromatic compound having attached to a nuclear carbon atom a carbon atom of a saturated hydrocarbon group and to which last named carbon atom is attached at least one hydrogen atom at condensation conditions in the presence of an alkali metal and an organic peroxy compound, and recovering the resultant condensation product.

Still another embodiment of this invention relates to a process for producing longer chain aromatic hydrocarbons which comprises reacting an alkene and an aromatic hydrocarbon having attached to a nuclear carbon atom a carbon atom of a saturated hydrocarbon group and to which last named carbon atom is attached at least one hydrogen atom at a condensation temperature in the presence of a catalyst comprising essentially sodium and an organic peroxy compound, and recovering the resultant condensation product.

A further embodiment of this invention relates to a process for producing a longer chain benzene hydrocarbon which comprises reacting an alkene and a benzene hydrocarbon having attached to a nuclear carbon atom a carbon atom of a saturated hydrocarbon group and to which last named carbon atom is attached at least one hydrogen atom at a condensation temperature in the presence of a catalyst comprising essentially sodium and an organic peroxy compound, and recovering the resultant condensation product.

A still further embodiment of this invention relates to a process for producing a longer chain benzene hydrocarbon which comprises reacting ethylene and a benzene hydrocarbon having attached to a nuclear carbon atom a carbon atom of a saturated hydrocarbon group and to which last named carbon atom is attached at least one hydrogen atom at a condensation temperature in the presence of a catalyst comprising essentially an alkali metal and an organic peroxy compound, and recovering a longer chain benzene hydrocarbon from the resultant reaction product.

An additional embodiment of this invention relates to a process for producing a longer chain benzene hydrocarbon which comprises reacting ethylene and a benzene hydrocarbon having attached to a nuclear carbon atom a carbon atom of a saturated hydrocarbon group and to which last named carbon atom is attached at least one hydrogen atom at a condensation temperature in the presence of a catalyst comprising essentially sodium and an organic peroxy compound, and recovering a longer chain benzene hydrocarbon from the resultant reaction products.

A still additional embodiment of this invention relates to a process which comprises catalytically reacting a non-conjugated olefinic hydrocarbon and an aromatic compound having a structure represented by the formula:

$$Ar-\underset{\underset{H}{|}}{\overset{\overset{R'}{|}}{C}}-R$$

wherein Ar represents an aromatic radical having a nucleus selected from carbocyclic and heterocyclic nuclei and R and R' each separately and independently represents a member of the group consisting of a hydrogen atom, an alkyl group, a cycloalkyl group, and an aryl group and R and R' together represent a cycloalkyl group, the process being carried out at a condensation temperature in the presence of a catalyst comprising essentially an alkali metal and an organic peroxy compound, and recovering the resultant condensation product.

Still another embodiment of this invention relates to a process for producing normal propylbenzene which comprises reacting ethylene and toluene at a condensation temperature in the presence of a catalyst comprising essentially sodium and an organic peroxy compound and recovering normal propylbenzene from the resultant reaction product.

Another embodiment of this invention relates to a process for producing normal propylbenzene which comprises reacting ethylene and toluene at a condensation temperature in the presence of a catalyst comprising essentially sodium and ditertiary butyl peroxide, and recovering normal propylbenzene from the resultant reaction product.

An additional embodiment of this invention relates to a process for producing normal propylbenzene which comprises reacting ethylene and toluene at a condensation temperature in the presence of a catalyst comprising essentially sodium and cumene hydroperoxide, and recovering normal propylbenzene from the resultant reaction product.

The compounds with which unsaturated organic compounds are condensed in our process comprise aromatic compounds having attached to a nuclear carbon atom a carbon atom of a saturated hydrocarbon group to which last named carbon atom is attached at least one hydrogen atom. By the term aromatic compound we mean to include not only alkylated benzenes, substituted benzenes, naphthalenes, and derivatives thereof, but also all compounds containing a stable ring or nucleus such as is present in benzene and which possesses unsaturation in the sense that benzene does, but which has no ethylenic unsaturation. Consequently it can be seen that the term aromatic compound, in the sense in which it is used in the specification and the appended claims, includes not only carbocyclic compounds but also heterocyclic compounds having stable nuclei. The carbocyclic compounds may have a benzene, naphthalene, etc. nucleus. The heterocyclic aromatic compounds may have a pyridine, furan, thiophene, pyrrole, pyrazole, etc., nucleus. In addition, the aromatic compound contemplated for use in our process may contain both a carbocyclic ring and a heterocyclic ring such as is found in indole and in carbazole. Also, the aromatic compounds may contain both a benzene nucleus and a cycloalkane nucleus such as is found in tetralin and in indan.

As hereinbefore stated, the aromatic compounds preferred for use in our process contain a saturated side chain, said chain being attached to a nuclear carbon atom by a saturated carbon atom, i. e., a carbon atom that is bonded by univalent bonds to four atoms. The saturated carbon atom should have at least one hydrogen atom attached thereto. These requisites are desirable for the reason that aromatic compounds, such as t-butylbenzene, which do not have a hydrogen atom attached to the alpha carbon atom, show very little tendency under the conditions of operation employed in our process to undergo condensation of the type herein taught. Similarly, styrene, in which the alpha carbon atom in the side chain is unsaturated, does not condense with unsaturated organic compounds in the manner herein specified. Thus the preferred aromatic compounds are those in which the alpha carbon atom of the side chain is saturated and in which said alpha carbon atom has at least one hydrogen atom attached thereto. The side chain may comprise only one carbon atom, as the methyl group in toluene, or it may comprise a number of saturated carbon atoms in straight chain or branched chain relation such as the normal butyl radical or the isobutyl radical in normal butylbenzene and isobutylbenzene, respectively. The substituent need not necessarily be an aliphatic chain; it may be a cycloalkane radical as in tetralin or as in cyclohexylbenzene or an aralkyl group as a benzyl group as in diphenylmethane.

Suitable alkylaromatic hydrocarbons include toluene, ethylbenzene, normal propylbenzene, cumene, normal and secondary butylbenzene, methylnaphthalene, and the like. Other suitable aromatic hydrocarbons include tetralin, indan, diphenylmethane, cyclopentylbenzene, and methylethylbenzene.

The aromatic ring in the compounds herein referred to may contain other substituents such as a chloro group, a methoxy group, an ethoxy group, a nitro group, and the like.

The aromatic reactants employed in our process are condensed with non-conjugated unsaturated organic compounds. The unsaturated organic compounds are olefinic in character and include monoolefins and particularly ethylene. For the purposes of this invention, aromatic compounds such as benzene are not regarded as being unsaturated. Examples of unsaturated organic compounds suitable for use in this process include monoolefins such as ethylene, propylene, 1-butene, 2-butene, and isobutylene, monoolefins of higher molecular weight: non-conjugated dienes such as 2,5-dimethyl-1,6-hexadiene and non-conjugated polyolefins containing more than two pairs of double bonds per molecule; unsaturated ketones such as mesityl oxide, and compounds such as allyl amine, allyl cyanide, acrylonitrile, alpha cyanoacrylonitrile, and the like.

Catalysts which are useful in this process include a combination of an alkali metal or of several alkali metals and at least one organic peroxy compound. Of the alkali metals: lithium, sodium, potassium, rubidium and cesium; the more plentiful sodium and potassium are generally preferred and particularly sodium because of its relatively lower cost. These alkali metals are utilized together with an organic peroxy compound. The presence of both an alkali metal and one or more of the mentioned class of organic peroxy compounds which decompose to form free radicals is necessary for effecting the combination or condensation of an olefin such as ethylene with the alkyl side chain or other saturated side chain of a carbocyclic or heterocyclic aromatic ring compound having attached to a nuclear carbon atom a saturated carbon atom to which is attached at least one hydrogen atom.

The organic peroxy compounds which are useful as catalyst components in this process include acetyl peroxide, benzoyl peroxide, ascaridole, ditertiarybutyl peroxide and also various hydrocarbon hydroperoxides such as tertiarybutyl hydroperoxide, tetralin hydroperoxide, methylcyclopentyl hydroperoxide, dimethylcyclopentyl hydroperoxide and various other hydroperoxides and peroxides which are formed by oxidation of olefinic and paraffinic hydrocarbons as well as certain aromatic and naphthenic hydrocarbons. Azo compounds, such as azobenzene, and diazo compounds are also usable in this process.

Better contacting of the reactants and catalysts and improved yields of desired products are sometimes effected by mixing peroxy compound with a catalyst supporting or spacing material such as activated charcoal; also granular coke, silica, alumina, pumice, porcelain, quartz, etc.; steel turnings, copper shot, etc. which do not have an adverse influence on the reaction but improve the mixing. Such spacing materials are useful in either batch type operation as in an autoclave or in continuous treatment in a tubular reactor or other suitable apparatus.

The process of this invention is carried out using either batch or continuous types of operation in suitable equipment such as autoclaves or tubular reactors constructed from steel or glass lined steel reactors. The process is carried out at a temperature of from about 100° to about 350° C. and preferably at a temperature of from about 150° to about 275° C. at a pressure of from about 5 to about 50 atmospheres. When the stirring or mixing of the reactants and catalyst is very thorough and efficient, the process may be carried out readily at a temperature of 125° C. and at a pressure of 5 atmospheres, but higher temperatures and pressures are preferred when the mixing is less efficient. The operating temperature and pressure will also be dependent upon the aromatic and olefinic hydrocarbons charged and upon the ratios of reactants present in the reaction zone, as well as upon the catalyst present.

In order to promote the primary side chain alkylation, that is, to attach only one alkyl group to the alkyl side chain and in some instances to decrease the loss of olefin through undesired side reactions, it is generally preferred to employ an excess of aromatic hydrocarbon to olefin such as ethylene in this process. In other words, the preferred ratio of aromatic hydrocarbon to olefinic hydrocarbon is greater than one.

The amount of catalyst used in the process is dependent upon the nature and reactivity of the aromatic hydrocarbon undergoing side chain alkylation and upon the nature of the olefin used as alkylating agent. Also the particular catalyst promoter has an influence upon the amount of alkali metal necessary for efficient operation of the process. In general from about 0.05 to about 0.5 atomic proportion of alkali metal is present per molecular proportion of alkylaromatic hydrocarbon or other side chain alkylatable hydrocarbon present in the reaction zone. Also from about 0.1 to about 5 mole per cent of an organic peroxy compound is employed per molecular proportion of alkylaromatic hydrocarbon present in the reaction zone. The amounts of alkali metal and peroxy compound used are not critical and depend upon other factors such as the hydrocarbons to be alkylated, the operating conditions, etc.

In carrying out the process the olefinic hydrocarbon charged such as ethylene may be introduced continuously or intermittently, the latter method being commonly employed in the usual type of batch operation conducted in an autoclave so that the consumption of ethylene can be followed by observing the decrease in operating pressure of the autoclave as the reaction progresses. After the reaction has reached the desired stage of completion, the reaction products are discharged from the autoclave, unconverted olefin such as ethylene is recovered for further use in the process or utilized for some other purpose. The mixture of reaction products is then subjected to suitable separation treatment such as filtration to remove unconsumed alkali metal catalyst followed by fractional distillation of normally liquid products to separate unconverted charging stock from side chain alkylated products and higher boiling materials, the latter being sometimes formed as by-products of the reaction.

In this process one molecular proportion of olefin such as ethylene and one molecular proportion of alkylaromatic hydrocarbon as toluene react in the presence of a catalyst as referred to herein to form a longer chain alkylaromatic hydrocarbon as illustrated by the following equation:

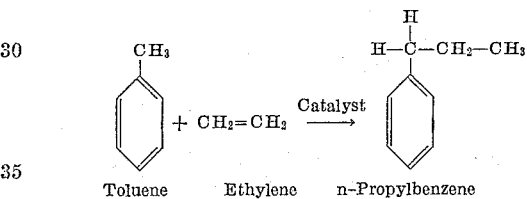

Toluene        Ethylene        n-Propylbenzene

The resultant reaction product such as n-propylbenzene may sometimes react with a further molecular proportion of olefin as ethylene to form a still longer chain alkylaromatic hydrocarbon as indicated in the following equation:

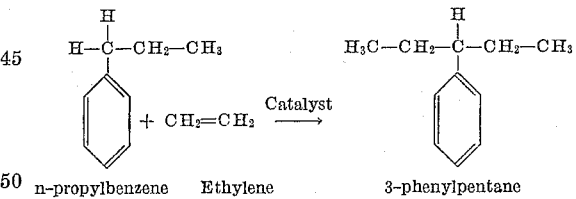

n-propylbenzene    Ethylene        3-phenylpentane

Other alkylaromatic hydrocarbons and cycloalkylaromatic hydrocarbons may be reacted similarly with ethylene to produce longer chain alkylaromatic hydrocarbons from one molecular proportion of the charged alkylaromatic hydrcarbon and one, two or more molecular proportions of the olefin.

The longer chain alkylaromatic hydrocarbons and other products formed by the process of this invention are useful as intermediates in the production of detergents, resins, insecticides, etc. For example a tridecyl benzene which is formed by condensing toluene with dodecene (propylene tetramer) or by condensing n-butylbenzene or sec-butylbenzene with propylene trimers may be sulfonated by strong sulfuric acid and then neutralized with a base to form a detergent. Other condensation products of this process may be chlorinated to form effective insecticides, fungicides, etc.

The nature of this invention is illustrated further by the following examples which should not be misconstrued to limit unduly the generally broad scope of the invention.

*Example 1*

A glass lined rotatable steel autoclave of 850 cc. capacity was charged with 92 grams (1 mole) of toluene, 6.7 grams (0.3 mole) of sodium and 2 grams of ditertiary-butyl peroxide (0.01 mole) after which the autoclave was closed and ethylene was then introduced through a control valve to an initial pressure of 30 atmospheres. The autoclave and its contents were then heated at a temperature of 200° to 250° C. for a time of 4 hours. After the autoclave and reaction mixture had cooled to room temperature, the product was removed from the autoclave, filtered to remove sodium, and the filtrate was fractionally distilled. The fractional distillation treatment separated the reaction product into 58 grams (0.63 mole) of unconverted toluene, 28 grams (0.26 mole) of normal propylbenzene and 4 grams (0.03 mole) of 3-phenylpentane. The yield of normal propylbenzene was 76 mole percent based upon the amount of toluene which reacted.

*Example II*

The autoclave employed in Example I was charged similarly with 92 grams (1 mole) of toluene, 6 grams (0.26 mole) of sodium and 10 grams (0.09 mole) of di-isobutylene containing some peroxides which formed therein by oxidation during storage. The autoclave was then closed and ethylene was admitted through a control valve to a pressure of 30 atmospheres. The charged autoclave was then heated to 200 to 250° C. for 5 hours after which it was permitted to cool to room temperature.

The reaction product obtained was separated into 73 grams (0.8 mole) of recovered toluene, 5.5 grams (0.05 mole) of n-propylbenzene, and 2.5 grams of higher boiling product.

*Example III*

The autoclave employed in Examples I and II was charged with 92 grams of toluene, 7.8 grams of sodium, 3.2 grams of cumene hydroperoxide (0.02 mole) and sufficient ethylene to give a pressure of 30 atmospheres at a temperature of 20° C. The charged autoclave was then heated at a temperature of 200–229° C. for a time of 5.75 hours after which the autoclave was cooled to room temperature. The unconverted ethylene was released from the autoclave and the resultant reaction product was removed from the autoclave and investigated. It was found that 10% of the toluene had reacted to give 6.5 grams of normal propylbenzene, a yield of 54% based upon the toluene which reacted. Also 3.7 grams of higher boiling product was obtained.

*Example IV*

The autoclave employed in the preceding examples was charged with 92 grams of toluene, 6.7 grams of sodium, 2 grams of azobenzene (0.01 mole) and ethylene to give a pressure of 30 atmospheres at 20° C. The charged autoclave was then rotated and heated at a temperature of 200–229° C. for a time of 3.5 hours after which the autoclave was cooled to room temperature. Residual gases amounting to 19.1 liters and containing 0.4 liter of ethane were released from the autoclave. The liquid reaction products were taken from the autoclave and found to contain 5.4 grams of normal propylbenzene and 2.5 grams of higher boiling product. As 9.8 grams of the charged toluene had reacted, the normal propylbenzene produced represented at 46 mole percent yield.

We claim as our invention:

1. A process which comprises reacting a non-conjugated olefinic hydrocarbon and an aromatic compound selected from the group consisting of carbocyclic aromatic and heterocyclic aromatic ring compounds having attached to a nuclear carbon atom a carbon atom of a saturated hydrocarbon group and to which last named carbon atom is attached at least one hydrogen atom at a temperature of from about 100° to about 350° C. and a pressure of from about 5 to about 50 atmospheres in the presence of an alkali metal and of an organic peroxy compound, and recovering the resultant condensation product.

2. A process which comprises reacting a non-conjugated olefin and an aromatic compound having attached to a nuclear carbon atom a carbon atom of a saturated hydrocarbon group and to which last named carbon atom is attached at least one hydrogen atom at a temperature of from about 100° to about 350° C. and a pressure of from about 5 to about 50 atmospheres in the presence of an alkali metal and of an organic peroxy compound, and recovering the resultant condensation product.

3. A process which comprises reacting a non-conjugated olefinic hydrocarbon and an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloalkalkyl group, and an aralkyl group and to which last named carbon atom is attached at least one hydrogen atom, the process being carried out at a temperature of from about 100° to about 350° C. and a pressure of from about 5 to about 50 atmospheres in the presence of an alkali metal and an organic peroxy compound, and recovering the resultant condensation product.

4. A process for producing longer chain aromatic hydrocarbons which comprises reacting an alkene and an aromatic hydrocarbon having attached to a nuclear carbon atom a carbon atom of a saturated hydrocarbon group and to which last named carbon atom is attached at least one hydrogen atom at a temperature of from about 100° to about 350° C. and a pressure of from about 5 to about 50 atmospheres in the presence of sodium and an organic peroxy compound, and recovering the resultant condensation product.

5. A process for producing a longer chain benzene hydrocarbon which comprises reacting ethylene and a benzene hydrocarbon having attached to a nuclear carbon atom a carbon atom of a saturated hydrocarbon group and to which last named carbon atom is attached at least one hydrogen atom at a temperature of from about 100° to about 350° C. and a pressure of from about 5 to about 50 atmospheres in the presence of an alkali metal and an organic peroxy compound, and recovering a longer chain benzene hydrocarbon from the resultant reaction product.

6. A process for producing a longer chain benzene hydrocarbon which comprises reacting ethylene and a benzene hydrocarbon having attached to a nuclear carbon atom a carbon atom of a saturated hydrocarbon group and to which last named carbon atom is attached at least one hydrogen atom at a temperature of from about 100° to about 350° C. and a pressure of from about 5 to about 50 atmospheres in the presence of sodium and an organic peroxy compound, and recovering a longer chain benzene hydrocarbon from the resultant reaction product.

7. A process for producing a longer chain benzene hydrocarbon which comprises reacting ethylene and toluene at a temperature of from about 100° to about 350° C. and a pressure of from about 5 to about 50 atmospheres in the presence of an alkali metal and an organic peroxy compound, and recovering a longer chain benzene hydrocarbon from the resultant reaction product.

8. A process for producing normal propylbenzene which comprises reacting ethylene and toluene at a temperature of from about 100° to about 350° C. and a pressure of from about 5 to about 50 atmospheres in the presence of sodium and ditertiary butyl peroxide, and recovering normal propylbenzene from the resultant reaction product.

9. A process for producing normal propylbenzene which comprises reacting ethylene and toluene at a temperature of from about 100° to about 350° C. and a pressure of from about 5 to about 50 atmospheres in the presence of sodium and cumene hydroperoxide and recovering normal propylbenzene from the resultant reaction product.

References Cited in the file of this patent

UNITED STATES PATENTS

| | | |
|---|---|---|
| 1,934,123 | Hofmann et al. | Nov. 7, 1933 |
| 2,396,217 | Vaughn et al. | Mar. 5, 1946 |
| 2,402,137 | Hanford et al. | June 18, 1946 |
| 2,448,641 | Whitman | Sept. 7, 1948 |
| 2,548,803 | Little | Apr. 10, 1951 |
| 2,552,980 | Ladd et al. | May 15, 1951 |
| 2,666,610 | Erchak | Nov. 24, 1953 |